(12) United States Patent
Futernik

(10) Patent No.: US 7,075,886 B2
(45) Date of Patent: Jul. 11, 2006

(54) METHOD AND APPARATUS FOR ROUTING INFORMATION IN SATELLITE COMMUNICATION NETWORKS

(75) Inventor: Albert Futernik, Oakland, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 997 days.

(21) Appl. No.: 10/024,629

(22) Filed: Dec. 21, 2001

(65) Prior Publication Data

US 2003/0137930 A1 Jul. 24, 2003

(51) Int. Cl.
*G01R 31/08* (2006.01)

(52) U.S. Cl. ................................ 370/216; 370/225

(58) Field of Classification Search ............ 370/216, 370/225

See application file for complete search history.

(56) References Cited

U.S. PATENT DOCUMENTS

| | | | |
|---|---|---|---|
| 5,365,520 A | 11/1994 | Wang et al. | |
| 5,430,729 A | 7/1995 | Rahnema | |
| 5,517,494 A * | 5/1996 | Green ........................ | 370/408 |
| 5,581,543 A | 12/1996 | Natarajan | |
| 5,859,895 A * | 1/1999 | Pomp et al. ............... | 379/9.05 |
| 5,930,254 A | 7/1999 | Liron et al. | |
| 5,974,036 A | 10/1999 | Acharya et al. | |
| 5,999,797 A | 12/1999 | Zancho et al. | |
| 6,157,624 A | 12/2000 | Zancho | |
| 6,157,834 A | 12/2000 | Helm et al. | |
| 6,272,139 B1 | 8/2001 | Soncodi | |
| 6,415,329 B1 * | 7/2002 | Gelman et al. ............. | 709/245 |
| 6,839,829 B1 * | 1/2005 | Daruwalla et al. ........... | 712/28 |
| 6,856,592 B1 * | 2/2005 | Grover et al. .............. | 370/216 |
| 6,856,600 B1 * | 2/2005 | Russell et al. ............. | 370/244 |
| 6,901,048 B1 * | 5/2005 | Wang et al. ................ | 370/228 |

FOREIGN PATENT DOCUMENTS

| | | |
|---|---|---|
| EP | 0 563 572 A2 | 10/1993 |
| EP | 0 993 155 | 4/2000 |
| EP | 1 085 679 | 3/2001 |
| WO | WO 98/48593 | 10/1998 |
| WO | WO 01/30090 | 4/2001 |

OTHER PUBLICATIONS

Akyildiz et al, Mobility Management in Current and Future Communication Networks, IEEE Network, Jul./Aug. 1998, pp. 39-49.

(Continued)

*Primary Examiner*—Hassan Kizou
*Assistant Examiner*—Jay P. Patel
(74) *Attorney, Agent, or Firm*—Edell, Shapiro & Finnan, LLC

(57) ABSTRACT

A communication network employed by the present invention includes one or more ground stations and a plurality of satellites. The ground stations and satellites basically serve as network nodes and each include a router that typically employs the OSPF routing protocol to route information through the network. The present invention utilizes apriori knowledge of topology changes to facilitate computations of routes. Since the network topology changes due to known movement of the satellites, the present invention predicts links becoming disabled based on the apriori knowledge and causes the OSPF protocol to recompute routes prior to disablement of the predicted links. The recomputation by the protocol is initiated by preventing transmission and reception of neighbor discovery and maintenance or "Hello" type packets over the predicted link. Thus, new routes are determined by the protocol prior to the previous routes becoming disabled due to a topology change.

28 Claims, 7 Drawing Sheets

OTHER PUBLICATIONS

Fall et al, The *ns* Manual (formerly *ns* Notes and Documentation, The VINT Project, Mar. 16, 2001, pp. 155-169.
Lucent Technologies Remote Access Business Unit, OSPF and the Internet, 1999, pp. 1-8.
Moy, RFC 1583, "OSPF Version 2", Mar. 1994.
Tannenbaum, "Computer Networks, Third Edition", Prentice Hall PTR, 1996, pp. 345-365.
"SBIRS", Space and Missile Systems Center, Los Angeles AFB, pp. 1-27.

* cited by examiner

METHOD AND APPARATUS FOR ROUTING INFORMATION IN SATELLITE COMMUNICATION NETWORKS

BACKGROUND OF THE INVENTION

1. Technical Field

The present invention pertains to satellite communication networks. In particular, the present invention pertains to low orbit satellite communication networks that utilize apriori knowledge of network topology (e.g., as a function of time or satellite geographical location) to enhance routing efficiency and significantly increase overall network performance.

2. Discussion of Related Art

Dynamic routing in a single Autonomous System of an Internet Protocol (IP) based communication network is typically accomplished by employing an Interior Gateway Protocol (IGP), such as the Open Shortest Path First (OSPF) routing protocol. The OSPF protocol is basically an internetworking or gateway protocol facilitating communications with external networks. For examples of implementation of the OSPF Protocol, reference is made to RFC 1583, Moy, "OSPF Version 2," March 1994, the disclosure of which is incorporated herein by reference in its entirety.

Routing is accomplished in the OSPF protocol by each network node having a routing database containing information related to network topology (e.g., links between network nodes). The routing database is utilized by each node to determine a path for transmitting a message to a destination site. The routing or path information is typically stored in a routing table. The routing databases are updated by exchanging link-state advertisement (LSA) packets between neighboring nodes. These packets generally include information related to current links of network nodes and are typically transferred periodically and/or in the event of a modification to the network topology. The OSPF protocol designates a particular router to flood LSA packets to neighbors in broadcast type networks, while LSA packets are transmitted via point-to-point and/or broadcast packets within non-broadcast type networks. Thus, the OSPF protocol is capable of ascertaining the topology of an Internet Protocol communication network and determining routes to be used by the Internet Protocol.

The OSPF protocol may further detect disabled communication links via periodic transmission and reception of neighbor discovery and maintenance or "Hello" type packets between network nodes. These packets are periodically transmitted by each node to discover neighboring nodes and to ensure communications between that node and the neighboring nodes. In addition, the OSPF protocol may determine alternative routes for current routes that utilize disabled links and are no longer viable. However, the OSPF routing protocol suffers from several disadvantages. In particular, the protocol takes a finite time interval to detect and repair a broken or disabled route. Although this is unavoidable in cases where the route becomes disabled due to an unforeseen event, protocol efficiency is less than optimal when apriori knowledge is available concerning network topology changes that affect viability of routes. In this case, protocol efficiency may be enhanced by determining alternative routes prior to a network topology change.

In an attempt to accommodate network topology changes, the related art provides various systems that determine alternative routes based on modifications to the network topology. For example, U.S. Pat. No. 5,365,520 (Wang et al) discloses dynamic signal routing. Data packets are delivered through a constellation of nodes or satellites to a termination unit. The node where a packet leaves the constellation is a terminal node. Each packet includes a routing code. When a node receives a packet, the node examines the routing code to determine if that node might be a terminal node for that packet. A table look up operation is performed using the routing code as an index to a routing table. The table identifies a link to use in routing the packet to a neighbor node. A number of different tables are used for each orbit, where the tables may be generated to track the movement of nodes over space regions. The packet is also examined to verify compatibility between packet type and a selected link. When a node concludes that the node might be a terminal node, the node evaluates a channel identifier to determine if the node is currently serving the party to whom the packet is directed.

U.S. Pat. No. 5,999,797 (Zancho et al) discloses a method and apparatus for providing private global networks in a satellite communication system. The private networks between communication terminals are established within a satellite communication system. Each private network provides users a network of dedicated communication paths that have durations exceeding the duration of the particular call. A dedicated communication path is established by determining hand-off schedules for satellite-to-terminal links for both a source and destination terminal, and by determining satellite crosslink schedules necessary to maintain the dedicated path for a duration exceeding the particular call.

U.S. Pat. No. 6,157,624 (Zancho) discloses a method and apparatus for linking terminals using private secondary service paths in a satellite communication system. The secondary paths between compatible or non-compatible communication terminals are established using terrestrial stations within a satellite communication system. Each secondary path provides users the ability to establish communication paths between compatible or non-compatible terminals. A secondary path is established using terrestrial stations that establish and maintain terrestrial-based links and satellite communication links. Terrestrial stations also perform frequency translating and data reformatting to allow non-compatible terminals to communicate with each other. Since the topology of a satellite communication system is constantly changing, maintenance of a secondary path involves satellite-to-terrestrial station hand-offs and establishment of different inter-satellite crosslinks. A prediction of system topology during the duration of the secondary path, or a portion thereof, is used to determine the satellite crosslinks.

The related art systems suffer from several disadvantages. In particular, the Wang et al system generates a stream of look up tables for each orbit to determine routing with respect to topology changes, thereby requiring significant processing and increasing system complexity. The Zancho et al and Zancho systems determine crosslink schedules that are employed by satellites to control crosslink establishment and relinquishment. Thus, these systems are required to distribute the schedules among the satellites, thereby providing additional tasks and overhead for communications. Further, since these systems control the crosslinks in accordance with the distributed schedules, the link control may interfere with and degrade performance of communication protocols employed by the systems.

The present invention basically overcomes the aforementioned problems by allowing the OSPF or other routing protocol to recompute routes prior to a known change in network topology. This is achieved by preventing the protocol neighbor discovery and maintenance or "Hello" type packets from being sent and received on a link that is about to become disabled due to a change in network topology. The cessation of these packets causes a protocol "dead" timer to expire for the link, thereby causing the protocol to consider the link disabled and recalculate routes in accordance with that consideration. Thus, new routes are determined prior to any previous routes becoming invalid due to the disabled link.

OBJECTS AND SUMMARY OF THE INVENTION

Accordingly, it is an object of the present invention to determine routes within a network in accordance with knowledge of known topology changes.

It is another object of the present invention to recompute routes within a network prior to current routes becoming disabled due to changes in network topology.

Yet another object of the present invention is to recompute routes within a network prior to current routes becoming disabled by establishing conditions within the network that cause a routing protocol to recompute those routes.

Still another object of the present invention is to enable a routing protocol to recompute routes within a network prior to current routes becoming disabled by inhibiting transmission and reception of neighbor discovery and maintenance packets over links about to become disabled.

The aforesaid objects may be achieved individually and/or in combination, and it is not intended that the present invention be construed as requiring two or more of the objects to be combined unless expressly required by the claims attached hereto.

According to the present invention, a communication network utilizes apriori knowledge of topology changes to facilitate computations of routes and to ensure transmission and reception of information. The communication network includes one or more ground stations and a plurality of satellites, preferably low orbiting. The ground stations and satellites basically serve as network nodes. The satellites each include a router that is interconnected to other satellite routers via point-to-point radio crosslinks, while the ground stations each include a router interconnected to satellite routers via radio uplinks and downlinks. The routers typically employ the OSPF routing protocol to route information through the network. Since the network topology changes due to known movement of the satellites, the present invention causes the OSPF protocol to recompute routes prior to certain routes becoming disabled. This is accomplished by preventing transmission and reception of neighbor discovery and maintenance or "Hello" type packets over the link becoming disabled due to a topology change. The present invention utilizes knowledge of the known satellite movements and topology changes to inhibit transmission and reception of those packets prior to a route becoming disabled. Thus, new routes are determined by the protocol prior to the previous routes becoming disabled due to a topology change.

DETAILED DESCRIPTION OF THE PREFERRED EMBODIMENTS

Figure 1:
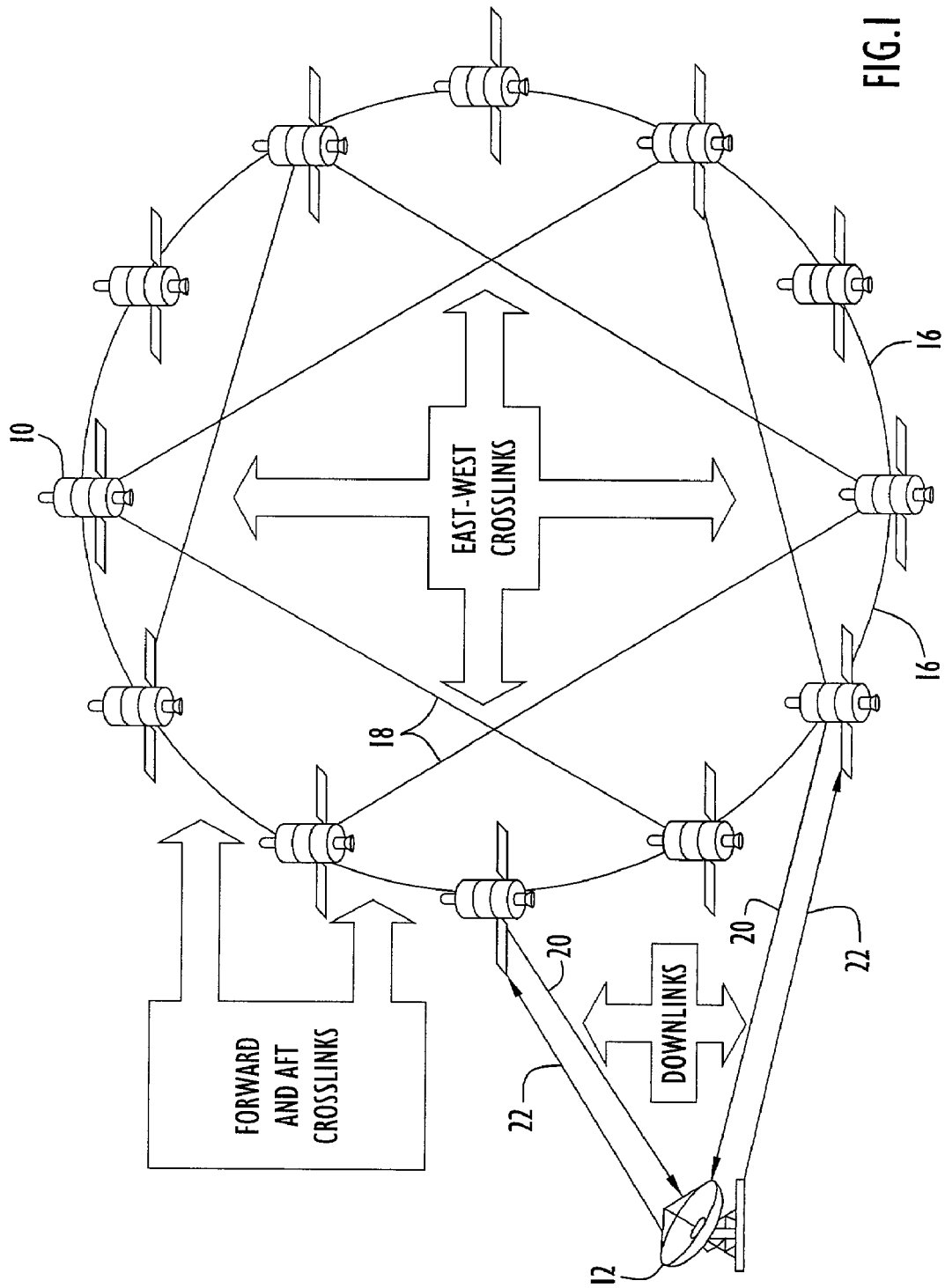
FIG. 1 is a diagrammatic illustration of an exemplary satellite communication network or system employed by the present invention.

An exemplary satellite communication network employed by the present invention is illustrated in FIG. 1. Specifically, the network includes a plurality of satellites 10, preferably low orbiting, and one or more ground stations 12. The ground stations and satellites basically serve as network nodes to facilitate communications through the network. The network may be utilized for various applications. For example, the satellites may collect and process information for transference to other satellites or a particular ground station via the communication network. Further, information may be transmitted between ground stations via the satellites (e.g., for general communications).

The satellites and ground station each include a router 14 (FIG. 2) that is interconnected with other network routers via point-to-point radio crosslinks (e.g., between satellite routers) or radio uplinks and downlinks (e.g., between satellite and ground station routers). Each satellite 10 includes a plurality of crosslinks 16, 18 to communicate with other satellites. Crosslinks 16 (e.g., forward and aft crosslinks as viewed in FIG. 1) basically arrange the satellites in a ring topology and enable communication between a particular satellite and the immediately succeeding (e.g., forward crosslink) and preceding (e.g., aft crosslink) satellites within the ring topology. These links are usually always enabled during system operation. Crosslinks 18 (e.g., East-West crosslinks as viewed in FIG. 1) facilitate communications between satellites having a mutual line of sight (e.g., the geographical positions of the satellites with respect to the Earth enable the existence of communication paths between the satellites). In other words, the satellites are positioned such that the Earth or other satellites do not interfere with transmissions between satellites. These crosslinks are enabled when the geographical location of satellites enable the satellites to have a line of sight with each other (e.g., enable existence of a communication path between the satellites). The satellites further include one or more radio downlinks 20 to ground station 12, while the ground station includes one or more uplinks 22 to satellites 10. Links 20, 22 are enabled when corresponding satellites are in position to have a line of sight (e.g., enable the existence of a communication path) with the ground station.

The communication network employs a routing protocol to facilitate routing of information throughout the network. By way of example only, the network utilizes the Open Shortest Path First (OSPF) Internet Protocol (IP) to dynamically discover routes. However, the network may employ any conventional or other routing protocols. According to the OSPF protocol, each node (e.g., satellite and ground station) within the network maintains a routing database (not shown) including information enabling the node to determine an appropriate path for routing a message. The information contained within the node databases typically relates to links (e.g., crosslinks, uplinks and downlinks) between the various network nodes, while routing information is typically maintained within a routing table. The OSPF protocol is a link-state type routing protocol and provides for synchronization of node databases through transmission of link-state advertisement (LSA) type or database update packets to each network node. These packets are conventionally transmitted to each neighboring network node via plural point-to-point messages (e.g., messages from a source node to a specific destination network node) in response to modifications to the network facilitating changes in a node database. When a database update packet is received, a point-to-point OSPF type acknowledgment (ACK) packet is commonly transmitted to the source node from the destination node to indicate packet reception. The OSPF protocol may further detect disabled communication links via periodic transmission and reception of neighbor discovery and maintenance or "Hello" type packets between network nodes. These packets are periodically transmitted by each node to discover neighboring nodes and to ensure communications between that node and the neighboring nodes. In addition, the OSPF protocol may determine alternative routes for current routes that utilize disabled links and are no longer viable.

The OSPF protocol is a link-state type protocol as described above and provides several advantages with respect to distance vector type protocols, such as RIP, where routers exchange vectors of distances of preferred paths to known destinations. For example, the OSPF protocol quickly discovers and disseminates information relating to disabled or broken links throughout the network. Further, link-state protocols generally have a faster convergence time than distance vector protocols. Moreover, distance vector protocols encounter "The Count-to-Infinity Problem", where these protocols react slowly to links becoming disabled. Although the conventional "Split Horizon" algorithm partially alleviates this problem, that algorithm provides several other disadvantages. These types of convergence problems are not encountered with link-state protocols. Since each router maintains a database of the complete network topology, information relating to a disabled link may be disseminated rapidly throughout the network. The routers recompute routing tables that reflect the updated topology database. Thus, a link-state routing protocol is better suited to topology dynamics than a distance vector protocol. Although link-state protocols usually include greater overhead, the overhead associated with the OSPF protocol is significantly less than network bandwidth as described below.

The present invention basically utilizes the features of the OSPF routing protocol and apriori knowledge of network topology (e.g., as a function of time or satellite geographical location) to enhance routing performance. The network topology knowledge enables the OSPF protocol to adjust a routing table prior to links becoming disabled due to changing satellite positions. The routing table adjustment essentially prevents the Internet Protocol from routing data packets to disabled links, thereby avoiding loss of those data packets.

Figure 2:
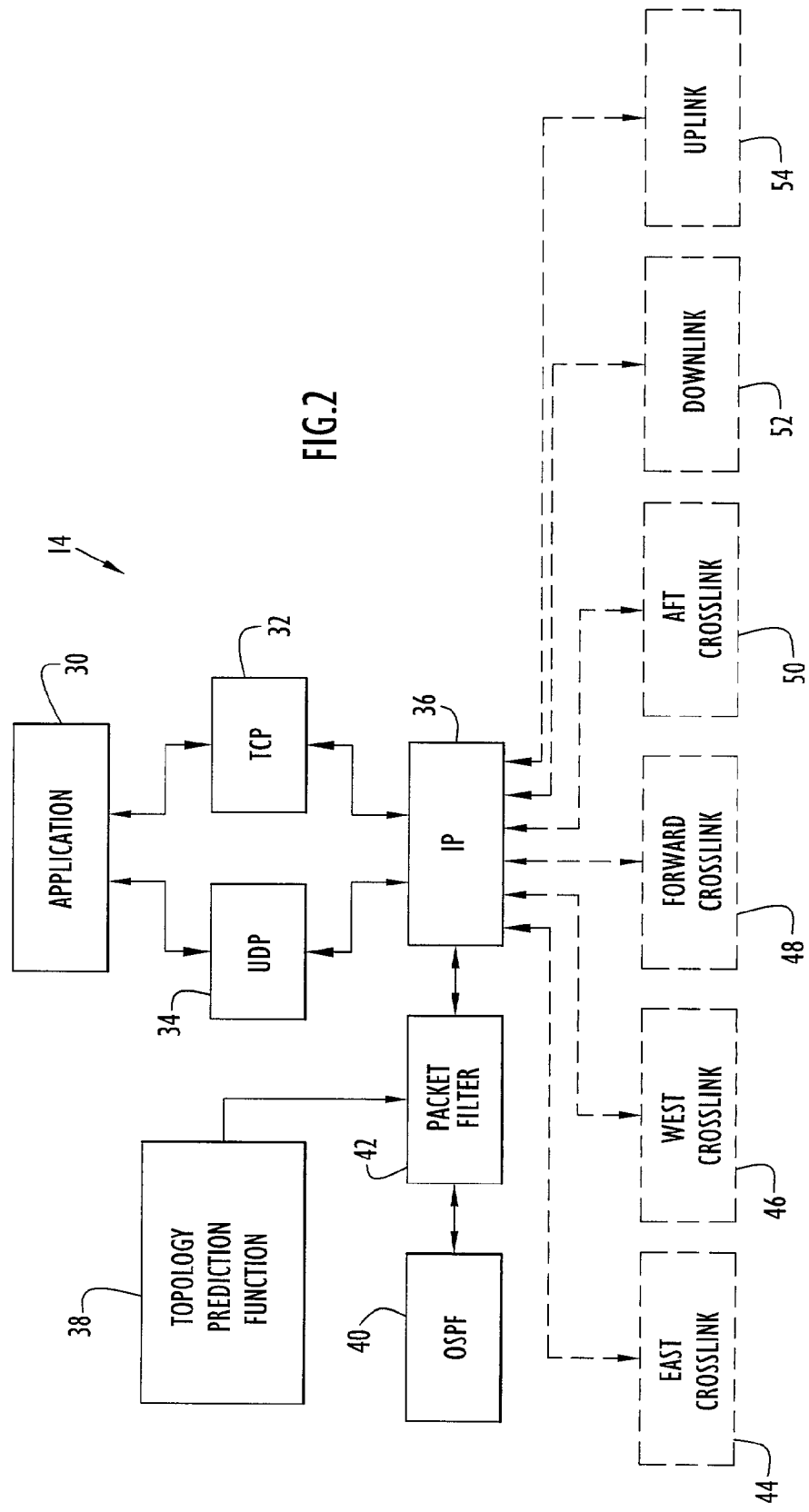
FIG. 2 is a block diagram of a router according to the present invention.

A network router according to the present invention is illustrated in FIG. 2. Initially, each satellite 10 (FIG. 1) includes a router 14 to route data packets throughout the network and facilitate communications. Specifically, router 14 includes an application module 30, transport protocol modules 32 (e.g., TCP), 34 (e.g., UDP), Internet Protocol module 36, topology prediction function (TPF) module 38, OSPF module 40, packet filter module 42 and ports 44, 46, 48, 50, 52 and 54. The various router modules or components are typically implemented by software modules executed on a router processor (not shown), however, the modules may be implemented by any software and/or hardware modules in any combinations thereof.

The router ports are coupled to radio transceivers (not shown) within the satellites to enable communications over crosslinks 16, 18, downlinks 20 and uplinks 22. The transceivers typically encrypt, modulate and transmit signals from a particular satellite and further receive signals from other satellites or the ground station. Ports 48, 50 are typically associated with crosslinks 16 coupling the satellite to the immediately succeeding and preceding satellites within the ring topology. Ports 44, 46 are associated with crosslinks 18 coupling the satellite to another satellite within the line of sight, while port 52 is associated with downlinks 20 coupling the satellite to ground station 12. Port 54 is associated with uplinks 22 coupling the ground station to satellites 10.

The ports are each coupled to IP module 36. This module basically implements the Internet Protocol and serves as a switch to direct outgoing data packets to the appropriate ports and to direct incoming data packets to the proper router module for processing. IP module 36 is further coupled to transport protocol modules 32, 34. These modules basically enable exchange of information between satellite or other applications over the network. Modules 32, 34 may be implemented by various transport protocols, but, by way of example only, are implemented by the Transmission Control Protocol (TCP) and the User Datagram Protocol (UDP), respectively. Application module 30 is coupled to the transport protocol modules and facilitates execution of particular router, satellite or other applications. Packet filter module 42 is coupled to IP module 36, with topology prediction function module 38 and OSPF module 40 coupled to packet filter module 42. OSPF module 40 basically implements the OSPF routing protocol, while modules 38, 42 modify the OSPF protocol to perform routing in accordance with the present invention as described below.

The ground station includes a router substantially similar to the router described above, except that the ground station router ports include ports 52, 54. The ports are coupled to radio transceivers (not shown) within the ground station to enable communications over downlinks 20 and uplinks 22. The transceiver typically encrypts, modulates and transmits signals from the ground station and receives signals from the satellites.

Modules 38, 42 modify the OSPF protocol to perform routing in accordance with the present invention as indicated in Table I below.

TABLE I

Dynamic System Recovery with Assistance of TPF

| Time | Module | Events |
| --- | --- | --- |
| $t - \tau$ | OSPF | The OSPF module receives a neighbor packet from one of its interfaces and starts the Dead Interval timer. |
| t | TPF | The TPF module predicts that a link is about to go down and informs the Packet Filter module. |

TABLE I-continued

Dynamic System Recovery with Assistance of TPF

| Time | Module | Events |
|---|---|---|
| t | Packet Filter | The Packet Filter module discards all the neighbor packets coming from or going to the interface or link that is predicted to go down. |
| t − τ + D | OSPF | The Dead Interval timer expires for the predicted link. OSPF starts to compute a new routing table and sends a Link State Update to its neighbors. |
| t − τ + D + T | OSPF | The OSPF Module finished the routing table calculations and passed the new routing table to the IP module. |
| t + D + T | Link | The predicted link goes down. |
| t + 2D + T | TPF | The TPF module informs the Packet Filter module to stop discarding the neighbor packets for the predicted link. |
| t + 2D + T | Packet Filter | The Packet Filter stops discarding the neighbor packets for the predicted link. |

In particular, topology prediction module 38 determines, based on apriori knowledge of satellite locations, that a crosslink 16, 18, a downlink 20 or an uplink 22 is about to become disabled at a time, t. This time is subsequent the time, t−τ, when the OSPF module received a neighbor discovery and maintenance packet from another satellite or the ground station and initiated a "Dead Interval" timer. The dead interval, D, corresponds to an interval within which a periodically transmitted neighbor packet is to be received over a particular link to indicate viability of that link. The time, τ, basically represents the interval between reception of the neighbor packet and the prediction time, t, where τ is an amount of time in the range of zero to the neighbor packet periodic transmission interval. The topology prediction function subsequently notifies packet filter module 42 that a crosslink, downlink or uplink is about to become disabled within a subsequent interval. This interval is represented by D+T which is the sum of the OSPF dead interval, D, and a time, T, representing the maximum amount of time required for OSPF module 40 to recalculate a routing table after expiration of the dead interval. In other words, the topology prediction module informs the packet filter module of a disabled link at a time prior to link disablement sufficient to permit expiration of the dead interval (e.g., when the OSPF protocol considers the link disabled) and calculation of new routes. This enables new routes to be determined and utilized for current routes that become disabled due to the disabled link as described below. Packet filter module 42 proceeds to discard incoming and outgoing neighbor packets at time, t, for the link predicted to be disabled in response to notification from topology prediction module 38.

The apriori knowledge relating to link disablement is typically stored in a look-up table accessible by the topology prediction module. The table generally includes information relating to satellite geographic position, time and link status (e.g., enabled or disabled). However, the look-up table may include any desired information. The information is generally provided for a predetermined time interval (e.g., two hours) corresponding to satellite orbits, and is repeatedly utilized for subsequent intervals. The topology prediction module accesses the look-up table information to predict disablement of links for route computation by the OSPF protocol as described below.

When the dead interval timer for the predicted link expires at time, t−τ+D (e.g., the sum of time, t−τ, when a neighbor packet is received and dead interval, D) the OSPF module computes a new routing table in time interval, T, and transmits a link-state update message to neighboring network nodes (e.g., satellites and/or ground stations) to update corresponding databases. Thus, the OSPF module determines that a link is disabled within the dead interval, D, and disseminates this information throughout the network via the protocol link-state database exchange. The OSPF module completes the routing table calculations subsequent expiration of the dead interval at time, t−τ+D+T (e.g., the sum of the expiration of the dead interval, t−τ+D, and time, T, for computing the routing table) and sends the new routing table to IP module 36. The predicted link becomes disabled after computation of the routing table at time, t+D+T (e.g., the sum of the prediction time, t, dead interval, D, and computation time, T) and, at expiration of a subsequent dead interval, D, at time, t+2D+T, the topology prediction module instructs the packet filter module to cease discarding the neighbor packets. This enables the OSPF module to receive neighbor packets over the link from a neighboring router, thereby detecting viability of that link. The OSPF module further adjusts the routing tables accordingly. The additional dead interval, D, serves as a buffer to alleviate slight inaccuracies in predicted timing and to prevent detection of a link just prior to that link becoming disabled. In other words, the additional interval ensures that the interval when the link is actually disabled coincides with the utilization of alternative routes determined by the OSPF protocol.

Figure 3:
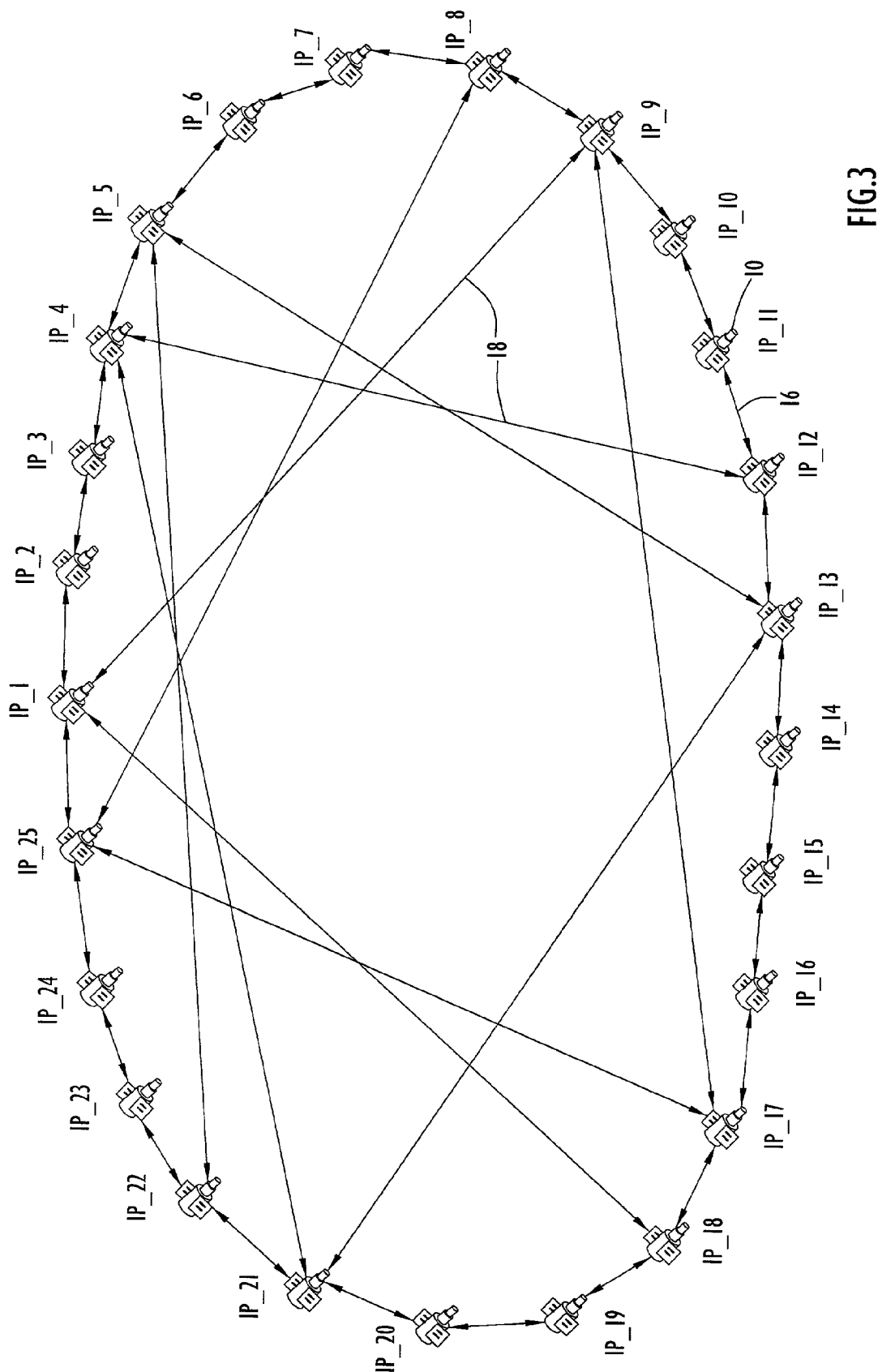
FIG. 3 is a diagrammatic illustration of an exemplary satellite communication network employed by the present invention as represented by a simulation tool.
Figure 4:
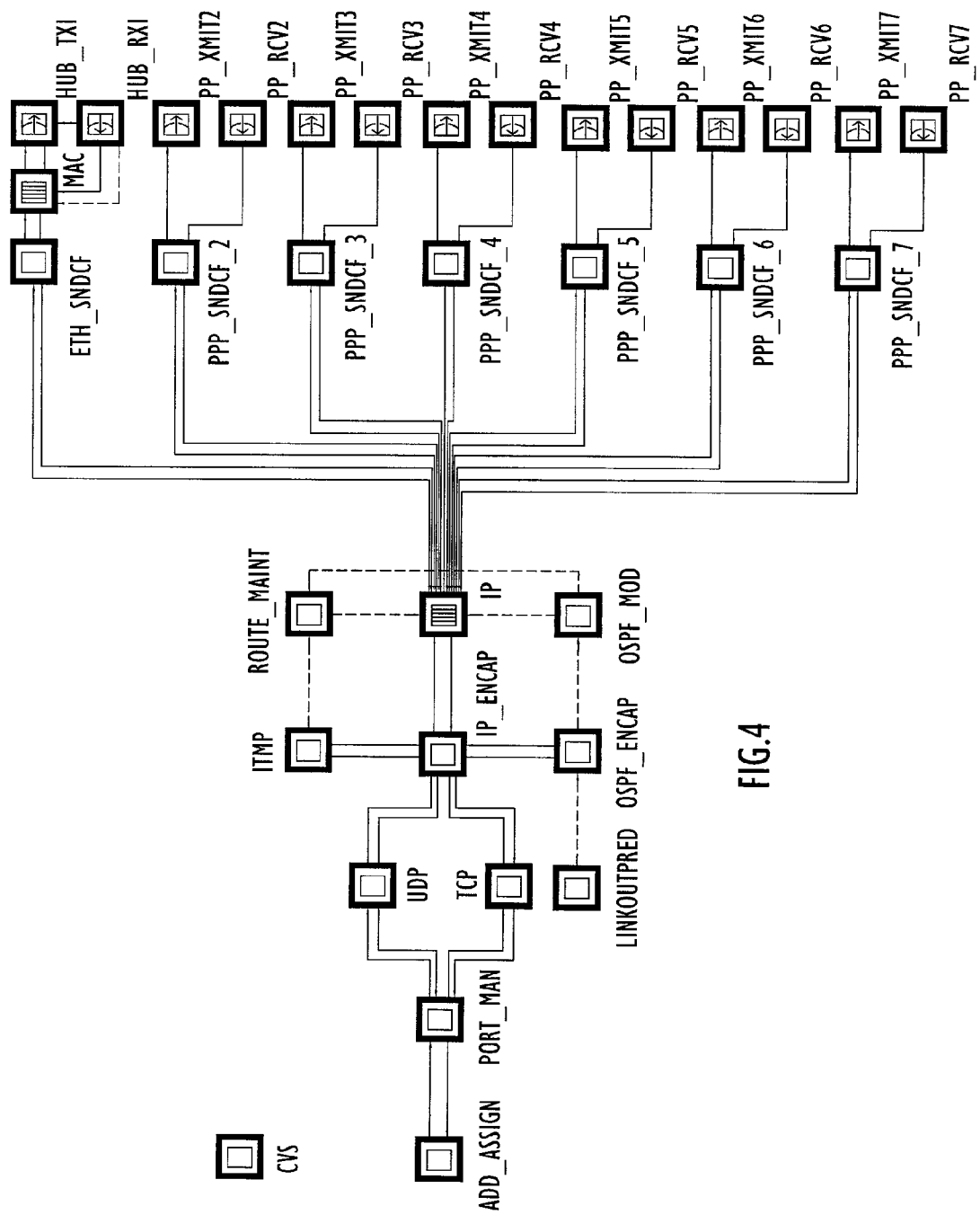
FIG. 4 is a diagrammatic illustration of an exemplary model of a present invention router as represented by the simulation tool.

The present invention network was modeled using the OPNET simulation tool. FIG. 3 illustrates the OPNET model representation of the exemplary network topology. Specifically, each satellite 10 is modeled as a router using a simulation tool node model. This node model is illustrated, by way of example, in FIG. 4. The node model basically simulates the protocol layers implemented in router 14 (FIG. 2) described above, and includes several modules that are described, by way of example only, in Table II below. The modules are typically implemented in software for execution by the simulation tool.

TABLE II

Exemplary Router Node Modules

| Module Name | Module Description |
| --- | --- |
| add_assign | The add_assign module assigns the source and destination IP addresses to the traffic generated by the built in traffic generators or the traffic that is read in from a file. |
| port_man | The port_man module passes the packets from the upper layer to the appropriate transport protocol (UDP or TCP) in the lower layer. This is done in both directions. |
| udp | The udp module implements the UDP protocol. |
| tcp | The tcp module implements the TCP protocol. |
| ip_encap | The ip_encap module implements the part of the IP protocol that encapsulates packets received from the transport layer with the IP headers before sending them to the intranet layer. For packets received from the lower layer, the ip_encap module strips the IP headers from the packets and sends the packets to the transport layer. |
| ip | The ip module implements the routing part of the IP protocol. |
| route_maint | The route_maint module holds the routing table used by the IP protocol. |
| icmp | (Not used for the simulations.) |
| LinkOutPred | The LinkOutPred module is the Topology Prediction Function (TPF). |
| ospf_encap | The ospf_encap module implements the encapsulation and de-encapsulation of the packets generated by the ospf_mod module. In addition, the ospf_encap module implements the Packet Filter. |
| ospf_mod | The ospf_mod module implements the OSPF version 2 (RFC 1583) adaptive routing protocol. |
| Eth_SNDCF | The Eth_SNDCF is the convergence function that maps the IP addresses to the Ethernet addresses. |
| mac | The mac module is the OPNET standard Ethernet Medium Access Control (MAC) layer. |
| hub_tx1 | The hub_tx1 module is the point-to-point transmitter from the Ethernet MAC layer to the Ethernet Hub. |
| hub_rx1 | The hub_rx1 module is the point-to-point receiver from the Ethernet Hub to the Ethernet MAC layer. |
| PPP_SNDCF_(2–7) | The PPP_SNDCF(2–7) are the convergence functions between IP and the Point-to-Point Protocol (PPP) links. |
| Pp_xmit(2–7) | The pp_xmit(2–7) modules are the point-to-point transmitters from one PPP_SNDCF module to another PPP_SNDCF module set to transmit packets at 20 Megabits per second (Mbps). |
| Pprcv(2–7) | The pp_rcv(2–7) modules are the point-to-point receiver from one PPP_SNDCF module to another PPP_SNDCF module set to receive packets at 20 Megabits per second (Mbps). |
| Cvs | The cvs module is used by version control to keep track of the model version number. |

The simulated conditions included a dynamic scenario with a data traffic load, the OSPF protocol and links 18 intermittently enabled and disabled. This scenario was further employed without the data traffic load to determine the overhead associated with the present invention routing on the communication network. The values of OSPF parameters for the simulation were selected in order to verify the routing technique, and may not necessarily have optimal values. The interfaces implementing the OSPF protocol in the simulation were configured for point-to-point as opposed to broadcast transmissions. The various OSPF parameters and corresponding values utilized for the simulation are described, by way of example only, in Table III below.

TABLE III

Exemplary OSPF Parameters

| OSPF Parameter | Value | Description |
| --- | --- | --- |
| OSPF_ack_delay_ptp | 10.0 | Delay in seconds of an acknowledgement of a newly received link state advertisement. |
| OSPF_LSRefreshTime | 200.0 | OSPF Link State Refresh timer in seconds. |
| OSPF_startup_interval | 10.0 | Random startup interval for OSPF in seconds. |
| Inf_Trans_Delay_ptp | 1.0 | The estimated number of seconds it takes to transmit a Link State Update Packet over this interface. |
| Retrans_interval_ptp | 1.0 | OSPF Retransmit Interval for point-to-point links in seconds. |
| Hello_interval_ptp | 2.5 | OSPF Hello Interval for point-to-point links in seconds. |
| Dead_interval_ptp | 5.0 | OSPF Dead Interval for point-to-point links in seconds. |

Each satellite 10 within the simulation scenario transmitted a set of messages to other satellites within the network. The source and destination of each message were uniformly distributed among the network satellites. The message storage capacity was approximately five-hundred bytes, while the messages were transmitted in accordance with the User Datagram Protocol (UDP). The message load for each satellite was approximately twenty-four messages per minute. An approximate forty byte acknowledgement was transmitted by a satellite application layer in response to each successfully received message. The simulated load is sufficient to verify operation of the network routing for successful completion of all messages.

The simulation scenario controlled crosslinks 16, 18 to simulate satellite movement. In particular, crosslinks 16 were enabled during the simulation, while crosslinks 18 were controlled (e.g., enabled and disabled) as a function of simulated time. The network connectivity as a function of time is described, by way of example only, in Table IV below.

TABLE IV

Network Connectivity Matrix

| Time (sec) | 01–09 | 01–18 | 04–12 | 04–21 | 05–13 | 05–22 | 08–25 | 09–17 | 13–21 | 17–25 |
|---|---|---|---|---|---|---|---|---|---|---|
| 0.0 | 1 | 1 | 0 | 0 | 1 | 1 | 0 | 1 | 1 | 0 |
| 595.0 | 1 | 1 | 0 | 1 | 1 | 1 | 0 | 1 | 1 | 1 |
| 600.0 | 1 | 0 | 0 | 1 | 1 | 0 | 0 | 1 | 1 | 1 |
| 1195.0 | 1 | 0 | 1 | 1 | 1 | 0 | 1 | 1 | 1 | 1 |
| 1200.0 | 0 | 0 | 1 | 1 | 0 | 0 | 1 | 1 | 1 | 1 |

The top row of the table indicates time and link identifiers. For example, the link identifier "01–09" indicates the link between satellites IP_1 and IP_9 of FIG. 3 described above. The initial table column indicates the simulation time, while the table entries specify the status (e.g., enabled or disabled) of the link associated with the corresponding link identifier at the indicated simulation time (e.g., a '1' indicates link enablement, while a '0' indicates that the link is disabled).

The topology prediction function was configured in the simulation to inhibit neighbor packets via the packet filter approximately six seconds prior to a crosslink 18 becoming disabled. The packet filter discarded these packets until instructed to cease this activity by the topology prediction function approximately five seconds after the link became disabled. The six second interval represents the sum of a dead interval, D, of five seconds and an interval, T, of one second for computation of routes as described above. An example of this interaction is illustrated in Table V below.

TABLE V

TPF Dynamics

| Time (sec) | Node Name | Stream | Switch (0/1) |
|---|---|---|---|
| 594.0 | IP_1 | 5 | 0 |
| 594.0 | IP_18 | 5 | 0 |
| 594.0 | IP_5 | 5 | 0 |
| 594.0 | IP_22 | 5 | 0 |
| 605.0 | IP_1 | 5 | 1 |
| 605.0 | IP_18 | 5 | 1 |
| 605.0 | IP_5 | 5 | 1 |
| 605.0 | IP_22 | 5 | 1 |
| 1194.0 | IP_1 | 4 | 0 |
| 1194.0 | IP_9 | 4 | 0 |
| 1194.0 | IP_5 | 4 | 0 |
| 1194.0 | IP_13 | 4 | 0 |
| 1205.0 | IP_1 | 4 | 1 |
| 1205.0 | IP_9 | 4 | 1 |
| 1205.0 | IP_5 | 4 | 1 |
| 1205.0 | IP_13 | 4 | 1 |

Specifically, the table indicates that the link (e.g., connected at IP stream five) between satellites IP_1 and IP_18 (FIG. 3) is predicted to become disabled. This prediction is determined at time, 594.0 seconds, thereby indicating that the link becomes disabled at the sum of the prediction time (e.g., 594.0 seconds), dead interval (e.g., five seconds) and computation interval (e.g., one second) as described above or at time, 600.0 seconds (Table IV). The topology prediction function waits for expiration of a subsequent dead interval (e.g., the sum of 600.0 seconds and a dead interval of five seconds) or until time, 605.0 seconds, to instruct the packet filters of satellites IP_1 and IP_18 to cease discarding the neighbor packets (e.g., a "0" in the switch column for satellites IP_1 and IP_18 at time, 594.0 seconds, indicates reception and transmission of packets, while a '1' in the switch column for these satellites at time, 605.0 seconds, indicates discard of packets just prior to receiving instructions to cease that activity).

The simulation results provided overhead information of the present invention routing on the communication network. The load information from the simulation is graphically illustrated in FIGS. 5A–5C. These figures basically illustrate a plot of OSPF traffic load on crosslinks between satellites IP_1 and IP_18 (e.g., indicated as 01-18), between satellites IP_17 and IP_25 (e.g., indicated as 17-25) and between satellites IP_25 and IP_1 (e.g., indicated as 25-01) of the communication network. Link 25-01 represents a crosslink 16 within the ring topology, while links 01-18 and 17-25 represent links 18 among satellites within a line of sight. Table IV indicates that crosslink 17-25 is enabled at time, 595.0 seconds, while crosslink 01-18 becomes disabled at time, 600.0 seconds. This is verified in FIGS. 5A and 5B by the lack of throughput during link disablement. Since link 25-01 is a ring topology link, the link remains enabled and provides throughput during the simulation as illustrated in FIG. 5C.

Figure 5A:
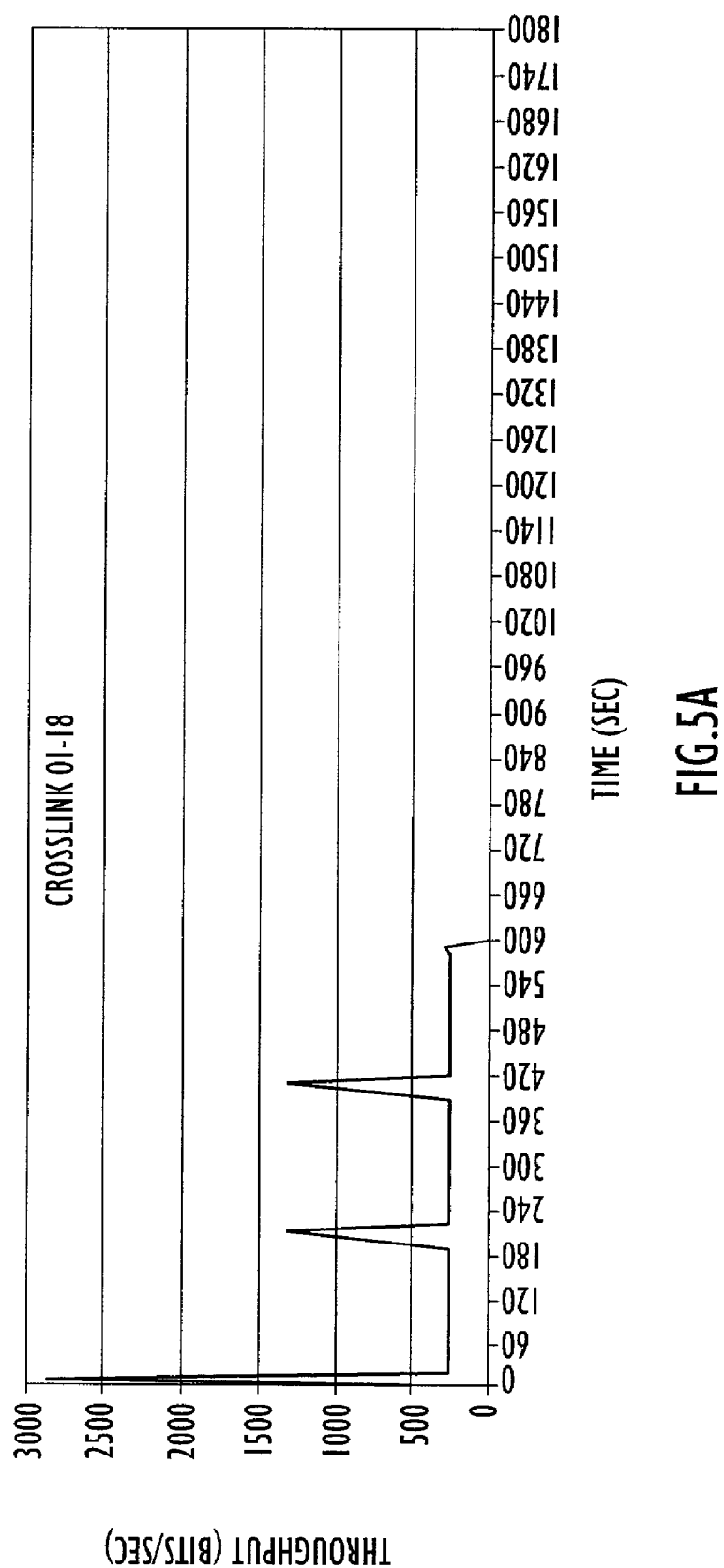
FIGS. 5A–5C are graphical illustrations of throughput for the simulated satellite communication network of FIG. 3.
Figure 5B:
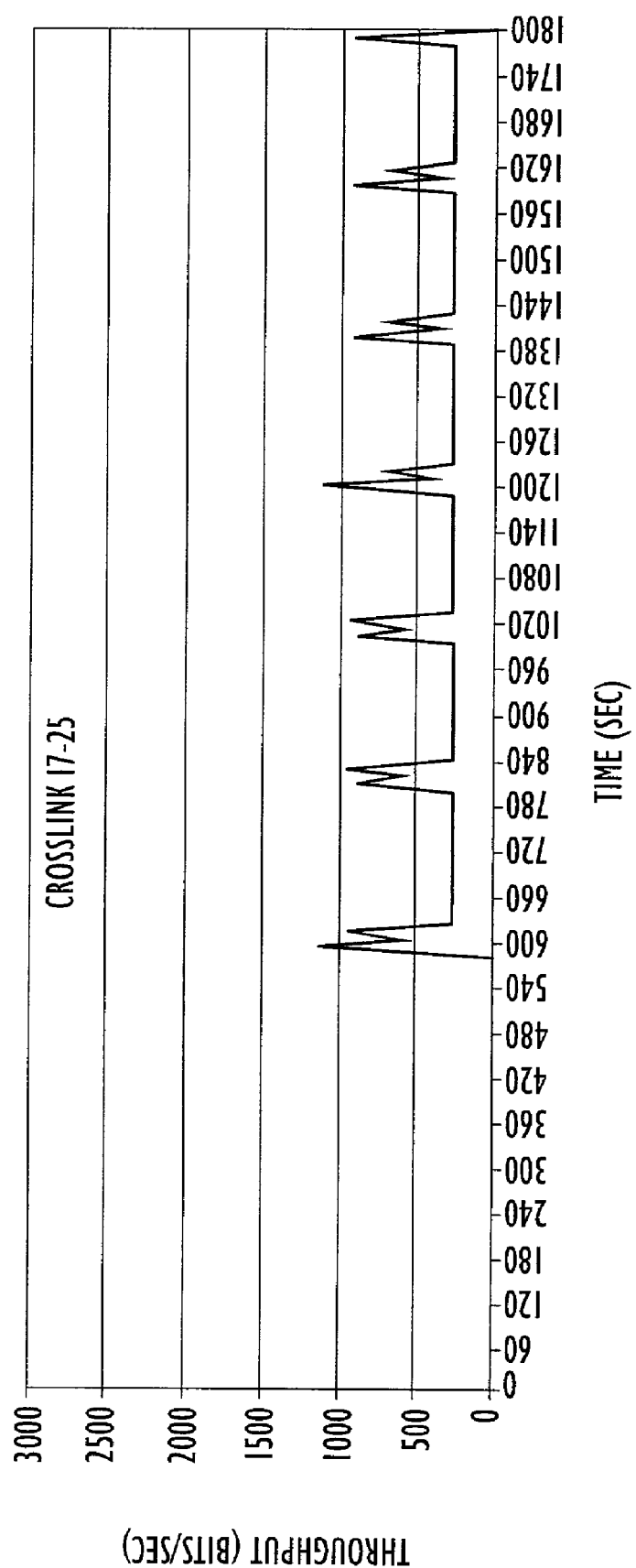
Figure 5C:
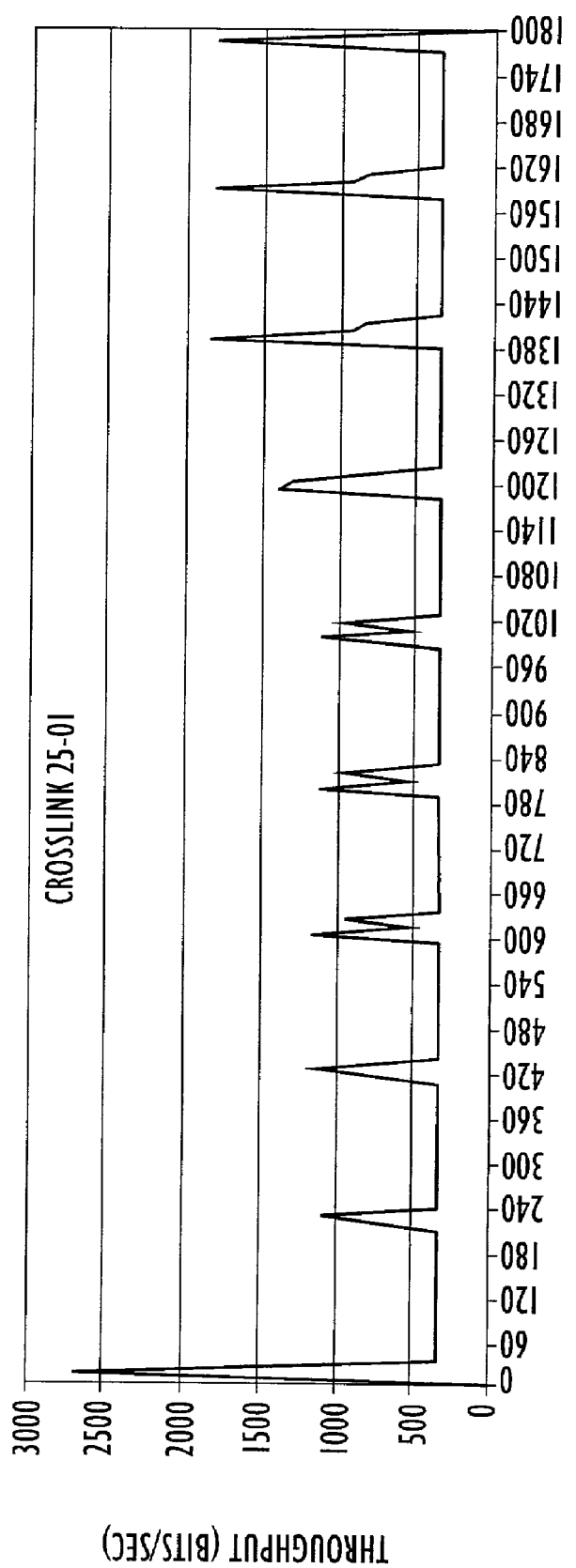

The throughput indicated in FIGS. 5A–5C is determined in accordance with a ten second window and is computed at time, t seconds, as follows:

$$\text{Throughput }(t) = 1/\Delta t \sum_{n=1}^{N(t)} S_n(t)$$

where $\Delta t$ is the window duration (e.g., set to ten seconds), $N(t)$ is the quantity of messages in a window at t seconds and $S_n(t)$ is the storage capacity (e.g., in bits) of the $n^{th}$ message in a window at t seconds.

The plots indicate the throughput at a single side of a duplex link. For example, FIG. 5A illustrates the OSPF throughput from satellite IP_1 to satellite IP_18, while FIG. 5B indicates the OSPF throughput from satellite IP_17 to satellite IP_25. FIG. 5C indicates the OSPF throughput from satellite IP_25 to satellite IP_1. The maximum throughput indicated on the plots is approximately three thousand bits per second (bps) which is approximately 0.015% of the available bandwidth of a twenty million bits per second (bps) crosslink as shown below.

Percentage of Overhead Bandwidth=100×3,000 bps/ 20,000,000 bps=0.015%

The simulation results indicated that when the topology prediction function was enabled, the network achieved total message completion. Thus, the present invention routing operated to reroute messages to new routes prior to links becoming disabled, thereby preventing the IP protocol from routing packets to disabled links. When the topology prediction function was disabled, the network suffered packet loss with an approximate ninety-eight percent message completion rate. The messages were lost due to the IP protocol routing packets to disabled links prior to the OSPF protocol detecting the disabled link, via the conventional dead interval timer, and updating the IP routing table.

The OSPF or other routing protocol combined with the topology prediction and packet filter of the present invention provides a routing mechanism that adequately accommodates the dynamic nature of a system. The present invention takes advantage of apriori knowledge of network topology as a function of time or satellite geographical location to enhance routing performance. The routing performance was verified via analysis of event timing and a simulation tool. The simulation indicated that the OSPF overhead on the network in a dynamic scenario is significantly less (e.g., a small percentage) than the available bandwidth, and that the present invention routing prevents the IP protocol from routing packets to disabled interfaces during system operation (e.g., without system failures). If system failures occur, the present invention routes packets around the failures via the OSPF protocol. This results in enhanced routing that combines the OSPF protocol with functionality that takes advantage of available and known network topology information.

It will be appreciated that the embodiments described above and illustrated in the drawings represent only a few of the many ways of implementing a method and apparatus for routing information in satellite communication networks.

The network may be implemented by any type of network where down time or topology changes may be predicted. The network may include any quantity of any conventional or other satellites (e.g., low orbiting, etc.), ground stations or other network nodes arranged in any desired fashion and at any locations. The satellites and ground stations may include any quantity of any types of links (e.g., uplinks, downlinks, crosslinks, etc.) to facilitate communications. The links may employ any suitable communications medium (e.g., radio or other signal energy of any desired frequency, various transmission media, etc.). The present invention may be applied to any conventional or other routing protocols that perform probing (e.g., determine topology and viability of links).

The router of the present invention may be of any quantity, and may be implemented by any conventional or other routing device or unit. The routers may communicate via the various links by any communications medium (e.g., radio or other energy signals of the same or different frequency). The router may employ any suitable routing protocol (e.g., OSPF, link-state, distance vector, etc.). The present invention may utilize any desired information or knowledge concerning network topology where the information may be based on any suitable criteria (e.g., time, position, etc.). The routing database and routing table may be implemented by any quantity of any conventional or other storage structures (e.g., database, table, file, record, array, data structure, etc.). The look-up table for storing the apriori knowledge may be implemented by any quantity of conventional or other storage structures (e.g., database, table, file, record, array, data structure, etc.).

The router modules may be implemented in software or hardware, or any combinations thereof. The router modules may be arranged in any fashion, while software implemented modules may be implemented in any computing language. The router may include any quantity of any conventional or other processor (e.g., microprocessor, controller, etc.) or circuitry to execute software implemented modules and/or realize hardware modules. The functions of the router modules may be distributed in any manner among any quantity of software and/or hardware modules within or external of the router. For example, a separate unit in communication with the router may be employed to implement the topology prediction and filtering functions. It is to be understood that one of ordinary skill in the computer arts could develop the software implemented modules of the present invention based on the drawings, tables and functional descriptions contained herein. Further, the present invention routing and various router or module functions may be modified in any fashion to attain the functions described herein.

The router may include any quantity of any type of applications (e.g., satellite, router, ground station, protocols, etc.) or application modules, and any quantity of any type of transport protocols (e.g., TCP, UDP, etc.). The router may include any quantity of ports for any quantity or type of communications or other devices (e.g., receiver, transmitter, transceiver, etc.). The transceivers may be implemented by any quantity of conventional or other transceivers or combinations of receivers and transmitters, and may encrypt, modulate, transmit and/or receive information in any desired fashion.

The topology prediction function may utilize any desired information or knowledge to predict disablement of links (e.g., geographic position, time, orbit, etc.). The various times or time intervals indicated above (e.g., prediction, dead interval, computation time, etc.) may be set or utilized in any desired units or portions thereof (e.g., hours, minutes, seconds, microseconds, nanoseconds, etc.). These times or intervals may be set to any desired values sufficient to conduct the routing. The time line for the routing may be modified in any desired fashion that accommodates the routing function described herein. The various timers (e.g., dead interval timer) may be implemented by any quantity of conventional or other timers, and may be implemented by software and/or hardware modules, or any combinations thereof.

The look up table or other storage structure storing the prediction knowledge may include any desired information for any desired time interval (e.g., hours, days, months, etc.). The topology prediction function may notify the packet filter to discard and accept packets via any suitable notification scheme (e.g., messages, interrupts, etc.). The interval between link disablement and enabling the packet filter to accept packets may be set to any desired interval (e.g., dead interval or any other desired time interval) to compensate for possible timing inconsistencies.

The packet filter may identify and discard packets based on any desired information (e.g., packet header information, information within packet data, etc.). The packet filter may discard and accept packets for any quantity of links. The packets transmitted by the network may be of any type, format or size.

The simulation may be performed via any conventional or other simulation tool. The simulation may be performed utilizing any scenarios (e.g., topology changing), models, routing or other parameters, loads (e.g., messages per time interval) and/or distribution of source and destinations among nodes. The simulated or actual throughput may be measured based on any desired window of any duration. The simulation may be performed with messages and/or acknowledgments of any type, format or size, and/or with any desired protocols (e.g., OSPF, UDP, etc.).

It is to be understood that the present invention is not limited to the applications disclosed herein, but may be applied to various communication networks and protocols to enhance routing. Further, the present invention may establish any suitable conditions (e.g., cease transmission and reception of certain packets, cause expiration of timers, etc.) within the network to cause a routing protocol to recompute routes in order to accommodate disablement of links due to topology changes or other network conditions.

From the foregoing description, it will be appreciated that the invention makes available a novel method and apparatus for routing information in satellite communication networks, wherein link disablement is predicted based on known topology information and conditions are established that cause a routing protocol to determine alternative routes prior to disablement of the links.

Having described preferred embodiments of a new and improved method and apparatus for routing information in satellite communication networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communication network wherein communication links become intermittently disabled, a communication unit to transmit and receive messages within said network comprising:
 a communication device to transmit an outgoing message to at least one other communication unit within said network and to receive an incoming message from at least one other communication unit within said network; and
 a routing device to route outgoing messages within said network to corresponding destination sites, wherein said routing device includes:
  a protocol module to facilitate routing of messages within said network in accordance with a routing protocol, wherein said protocol module includes a network module to determine routes within said network for transmission of said outgoing messages to said corresponding destination sites, and wherein said routing protocol facilitates recomputation of said routes within said network by said network module in response to occurrence of a particular condition indicating disablement of a communication link; and
  a route generation module to predict occurrence of disablement of said communication link and establish said particular condition within said network prior to actual disablement of that communication link to enable said network module to recompute said routes based on and prior to said communication link disablement in accordance with said routing protocol.

2. The communication unit of claim 1, wherein said communication network is a satellite communication network and said communication unit is a satellite.

3. The communication unit of claim 1, wherein said communication network is a satellite communication network and said communication unit is a ground station.

4. The communication unit of claim 1, wherein said routing protocol is the OSPF routing protocol.

5. The communication unit of claim 1, wherein said protocol module periodically transmits neighbor packets in order to verify communication links with other communication units, and wherein said particular condition is the absence of transmission and reception of said neighbor packets within a corresponding interval.

6. In a communication network wherein communication links become intermittently disabled, a communication unit to transmit and receive messages within said network comprising:
 a communication device to transmit an outgoing message to at least one other communication unit within said network and to receive an incoming message from at least one other communication unit within said network; and
 a routing device to route outgoing messages within said network to corresponding destination sites, wherein said routing device includes:
  a protocol module to facilitate routing of messages within said network in accordance with a routing protocol, wherein said protocol module includes a network module to determine routes within said network for transmission of said outgoing messages to said corresponding destination sites, wherein said routing protocol facilitates recomputation of said routes within said network by said network module in response to occurrence of a particular condition, and wherein said protocol module periodically transmits neighbor packets in order to verify communication links with other communication units and said particular condition is the absence of transmission and reception of said neighbor packets within a corresponding interval; and
  a route generation module to establish said particular condition within said network prior to occurrence of disablement of a communication link to enable said network module to recompute said routes based on said communication link disablement and in response to said routing protocol, wherein said route generation module includes:

a prediction module to examine information associated with known changes of network topology and to predict occurrence of disablement of a communication link due to a known network topology change prior to actual disablement of that communication link; and a filter module responsive to said prediction module to discard said neighbor packets received from or for transmission over said predicted communication link, wherein said discarding of neighbor packets establishes said particular condition and causes said network module to recompute routes within said network in response to said routing protocol.

7. The communication unit of claim 6, wherein said routing device includes a storage unit to store said information associated with said known network topology changes.

8. The communication unit of claim 6, wherein said prediction module includes:

a link enablement module to instruct said filter module to process said neighbor packets received from or for transmission over said predicted communication link in response to expiration of an interval subsequent disablement of said predicted communication link to facilitate detection of revival of said predicted communication link by said routing protocol.

9. A communication network comprising:

a plurality of communication units for transferring information, wherein communication links between said communication units become intermittently disabled and each said communication unit includes:

a routing device to route outgoing messages within said network to corresponding destination sites, wherein said routing device includes:

a protocol module to facilitate routing of messages within said network in accordance with a routing protocol, wherein said protocol module includes a network module to determine routes within said network for transmission of said outgoing messages to said corresponding destination sites, and wherein said routing protocol facilitates recomputation of said routes within said network by said network module in response to occurrence of a particular condition indicating disablement of a communication link; and a route generation module to predict occurrence of disablement of said communication link and establish said particular condition within said network prior to actual disablement of that communication link to enable said network module to recompute said routes based on and prior to said communication link disablement in accordance with said routing protocol.

10. The communication network of claim 9, wherein a plurality of said communication units are satellites and at least one of said communication units is a ground station.

11. The communication network of claim 9, wherein said routing protocol is the OSPF routing protocol.

12. The communication network of claim 9, wherein said protocol module periodically transmits neighbor packets in order to verify communication links between communication units, and wherein said particular condition is the absence of transmission and reception of said neighbor packets within a corresponding interval.

13. A communication network comprising:

a plurality of communication units for transferring information, wherein communication links between said communication units become intermittently disabled and each said communication unit includes:

a routing device to route outgoing messages within said network to corresponding destination sites, wherein said routing device includes:

a protocol module to facilitate routing of messages within said network in accordance with a routing protocol, wherein said protocol module includes a network module to determine routes within said network for transmission of said outgoing messages to said corresponding destination sites, wherein said routing protocol facilitates recomputation of said routes within said network by said network module in response to occurrence of a particular condition, and wherein said protocol module periodically transmits neighbor packets in order to verify communication links between communication units and said particular condition is the absence of transmission and reception of said neighbor packets within a corresponding interval; and a route generation module to establish said particular condition within said network prior to occurrence of disablement of a communication link to enable said network module to recompute said routes based on said communication link disablement and in response to said routing protocol, wherein said route generation module includes:

a prediction module to examine information associated with known changes of network topology and to predict occurrence of disablement of a communication link due to a known network topology change prior to actual disablement of that communication link; and a filter module responsive to said prediction module to discard said neighbor packets received from or for transmission over said predicted communication link, wherein said discarding of neighbor packets establishes said particular condition and causes said network module to recompute routes within said network in response to said routing protocol.

14. The communication network of claim 13, wherein said prediction module includes:

a link enablement module to instruct said filter module to process said neighbor packets received from or for transmission over said predicted communication link in response to expiration of an interval subsequent disablement of said predicted communication link to facilitate detection of revival of said predicted communication link by said routing protocol.

15. In a communication network including a plurality of communication units wherein communication links between communication units become intermittently disabled, a method of transmitting and receiving messages within said network comprising the steps of:

(a) routing outgoing messages within said network to corresponding destination sites in accordance with a routing protocol, wherein said routing includes determination of routes within said network and said routing protocol facilitates recomputation of said routes within said network in response to occurrence of a particular condition indicating disablement of a communication link; and (b) predicting occurrence of disablement of said communication link and establishing said particular condition within said network prior to actual disablement of that communication link to enable recomputation of said routes based on and prior to said communication link disablement in accordance with said routing protocol.

16. The method of claim 15, wherein said communication network is a satellite communication network, and wherein a plurality of said communication units are satellites and at least one of said communication units is a ground station.

17. The method of claim 15, wherein said routing protocol is the OSPF routing protocol.

18. In a communication network including a plurality of communication units wherein communication links between communication units become intermittently disabled, a method of transmitting and receiving messages within said network comprising the steps of:
   (a) routing outgoing messages within said network to corresponding destination sites in accordance with a routing protocol, wherein said routing includes determination of routes within said network and said routing protocol facilitates recomputation of said routes within said network in response to occurrence of a particular condition; and
   (b) establishing said particular condition within said network prior to occurrence of disablement of a communication link to enable recomputation of said routes based on said communication link disablement and in response to said routing protocol, wherein said communication units periodically transmit neighbor packets in order to verify communication links with other communication units and said particular condition is the absence of transmission and reception of said neighbor packets within a corresponding interval, and wherein step (b) further includes:
      (b.1) inhibiting transmission and reception of said neighbor packets by said communication units prior to occurrence of disablement of a communication link to enable recomputation of said routes based on said communication link disablement and in response to said routing protocol.

19. The method of claim 18, wherein step (b.1) further includes:
   (b.1.1) examining information associated with known changes of network topology and predicting occurrence of disablement of a communication link due to a known network topology change prior to actual disablement of that communication link; and
   (b.1.2) discarding said neighbor packets received from or for transmission over said predicted communication link in response to said prediction, wherein said discarding of neighbor packets establishes said particular condition and causes recomputation of said routes within said network in response to said routing protocol.

20. The method of claim 19, wherein step (b.1) further includes:
   (b.1.3) processing said neighbor packets received from or for transmission over said predicted communication link in response to expiration of an interval subsequent disablement of said predicted communication link to facilitate detection of revival of said predicted communication link by said routing protocol.

21. In a communication network wherein communication links become intermittently disabled, a communication unit to transmit and receive messages within said network comprising:
   communication means for transmitting an outgoing message to at least one other communication unit within said network and for receiving an incoming message from at least one other communication unit within said network; and
   routing means for routing outgoing messages within said network to corresponding destination sites, wherein said routing means includes:
      protocol means for facilitating routing of messages within said network in accordance with a routing protocol, wherein said protocol means includes network means to determine routes within said network for transmission of said outgoing messages to said corresponding destination sites, and wherein said routing protocol facilitates recomputation of said routes within said network by said network means in response to occurrence of a particular condition indicating disablement of a communication link; and
      route generation means for predicting occurrence of disablement of said communication link and establishing said particular condition within said network prior to actual disablement of that communication link to enable said network means to recompute said routes based on and prior to said communication link disablement in accordance with said routing protocol.

22. The communication unit of claim 21, wherein said communication network is a satellite communication network and said communication unit is a satellite.

23. The communication unit of claim 21, wherein said communication network is a satellite communication network and said communication unit is a ground station.

24. The communication unit of claim 21, wherein said routing protocol is the OSPF routing protocol.

25. The communication unit of claim 21, wherein said protocol means includes message means for periodically transmitting neighbor packets in order to verify communication links with other communication units, and wherein said particular condition is the absence of transmission and reception of said neighbor packets within a corresponding interval.

26. In a communication network wherein communication links become intermittently disabled, a communication unit to transmit and receive messages within said network comprising:
   communication means for transmitting an outgoing message to at least one other communication unit within said network and for receiving an incoming message from at least one other communication unit within said network; and
   routing means for routing outgoing messages within said network to corresponding destination sites, wherein said routing means includes:
      protocol means for facilitating routing of messages within said network in accordance with a routing protocol, wherein said protocol means includes network means to determine routes within said network for transmission of said outgoing messages to said corresponding destination sites, wherein said routing protocol facilitates recomputation of said routes within said network by said network means in response to occurrence of a particular condition, and wherein said protocol means further includes message means for periodically transmitting neighbor packets in order to verify communication links with other communication units and said particular condition is the absence of transmission and reception of said neighbor packets within a corresponding interval; and route generation means for establishing said particular condition within said network prior to occurrence of disablement of a communication link to enable said network means to recompute said routes based on said communication link disablement and in response to said routing protocol, wherein said route generation means includes:

prediction means for examining information associated with known changes of network topology and for predicting occurrence of disablement of a communication link due to a known network topology change prior to actual disablement of that communication link; and filter means responsive to said prediction means for discarding said neighbor packets received from or for transmission over said predicted communication link, wherein said discarding of neighbor packets establishes said particular condition and causes said network means to recompute routes within said network in response to said routing protocol.

27. The communication unit of claim 26, wherein said routing means includes storage means for storing said information associated with said known network topology changes.

28. The communication unit of claim 26, wherein said prediction means includes:

link enablement means for instructing said filter means to process said neighbor packets received from or for transmission over said predicted communication link in response to expiration of an interval subsequent disablement of said predicted communication link to facilitate detection of revival of said predicted communication link by said routing protocol.

* * * * *